Nov. 24, 1931.                L. V. FOSTER                1,833,073
                              OPTICAL SYSTEM
                      Filed Feb. 25, 1929    2 Sheets-Sheet 1

LEON V. FOSTER
INVENTOR

BY  G.A. Ellestad
ATTORNEY

LEON V. FOSTER
INVENTOR

BY G.A. Ellestad

ATTORNEY

Patented Nov. 24, 1931

1,833,073

UNITED STATES PATENT OFFICE

LEON V. FOSTER, OF IRONDEQUOIT, NEW YORK, ASSIGNOR TO BAUSCH & LOMB OPTICAL COMPANY, OF ROCHESTER, NEW YORK, A CORPORATION OF NEW YORK

OPTICAL SYSTEM

Application filed February 25, 1929. Serial No. 342,333.

This invention is applicable to the art of producing or reproducing a photographic record such, for example, as that formed by light rays which are caused to vary in accordance with variations of sound waves. More particularly this invention has reference to an improved slit unit which is used for limiting the light beam in optical systems such as those used in producing or reproducing photographic records of sound, for example.

In producing a photographic sound record, light from a suitable source is caused to pass through a narrow slit and lens system onto a moving sensitized film so that the variations in the light source, which are produced by variations in sound waves by suitable apparatus, are thereby recorded on the film, as is well known to those skilled in the art. In producing such a record, it is necessary that the image of the narrow slit, which is projected onto the film, should be very sharp and well defined in order to produce a true, accurate record of the sound. The image of the slit which is produced by apparatus of the prior art, however, is not sharp and well defined throughout its entire length because of the curvature of field which is introduced by the lens system which causes relatively wide, indistinct portions at each end of the image of the slit. If an attempt is made to correct this curvature of field by using suitably corrected lenses, the effective working aperture of the lens system is greatly restricted so that enough light for efficient operation does not reach the film because the light source which is used with this type of apparatus is relatively weak. Therefore, it is important that the working aperture of the lens system be kept as large as possible.

One of the objects of the present invention is to provide improved slit means for use in an optical system. Another object is to provide an improved slit unit which will be useful in apparatus for photographically recording sound. Other objects and advantages reside in certain novel features of construction, arrangement and combination of parts which will hereinafter be described and pointed out in the appended claims.

Referring now to the drawings.

Figure 1:
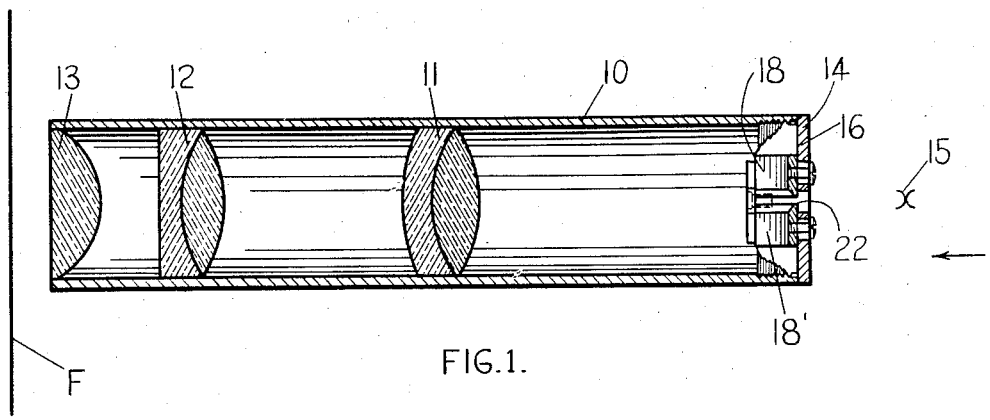
Fig. 1 shows a vertical section of a sound recording apparatus embodying my invention.

In the drawings I have shown one embodiment of my invention as applied to an apparatus for photographically recording sound. This apparatus comprises a mounting such as tubing 10 in which suitable lenses 11, 12 and 13 are mounted and at one end of which there is disposed my improved slit unit which is indicated generally, at 14. The slit is illuminated by a suitable adjacent light source 15 and a reduced image of the slit is projected onto the sentitized film F by means of the lenses 11, 12 and 13. By means of suitable apparatus, variations in sound waves produce corresponding variations in the intensity of the light source 15 so that the sound variations are photographically recorded on the moving sensitized film F, all as is well known to those skilled in the art.

The slit unit 14 comprises a supporting disc 16, which is threaded into the tubing 10, and is provided with a relatively large horizontal slot 17. Mounted on the inner side of the disc 16 are the two spaced arcuately curved jaws 18 and 18' which are held in place by screws 19, 19' and screws 20, 20' which cooperate with retaining members 21 and 21'. These spaced jaws define a very narrow curved slit 22, the edges of the jaws preferably being beveled as at 23. In one slit which I have used, the slit is 0.122 millimeters wide and each of the semi-circular jaws forming the slit has a radius of curvature which is 8.0 millimeters. The slit 22 is, of course, much narrower than shown in exaggerated size in the drawing.

Figure 7:
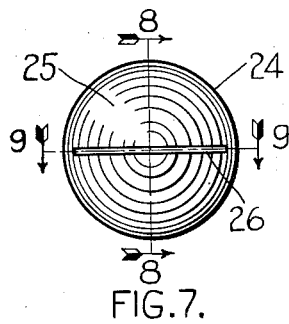
Fig. 7 shows a front elevation of a modified slit unit.
Figure 8:
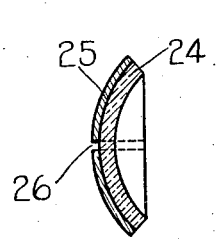
Fig. 8 is a vertical section taken on line 8—8.
Figure 9:
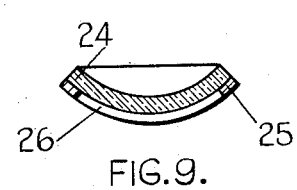
Fig. 9 is a horizontal section taken on line 9—9.

A modified form of my slit unit is illustrated in Figs. 7, 8 and 9, wherein 24 indicates a clear glass member whose convex spherical surface carries an opaque coating 25, such as a thick layer of silver, for example. A portion of the opaque layer is removed to form the narrow slit 26. Since the convex surface of the glass member 24 is spherical, it is obvious that the slit 26 will be curved and will have the same curvature as the convex surface of the glass member 24. It will also be obvious that the curved slit can be formed on a glass member whose convex surface is cylindrical instead of spherical, the slit in that case will, of course, lie in a plane which is perpendicular to the axis of the cylindrical surface. It will be understood that the slit 26 and the opaque coating 25 are shown in exaggerated size in the drawings for sake of clearness.

The operation and function of my improved slit can best be explained by reference to Figs. 10 to 13. One method of recording sound records on a photographic film, as practiced in the prior art, is illustrated diagrammatically in Fig. 10. In this method, a very narrow linear slit is illuminated by a suitable light source L, the illuminated slit being indicated at S. By means of suitable lenses A, B and C, a reduced image of the illuminated slit S is projected onto the film F. Because of the aberrations, such as curvature of field, which are introduced by the lenses A, B and C, the sharply focused image of S will appear as a curved aerial image indicated at I in Fig. 10. Since the central portion of the curved image I falls on the film F, this portion will be sharply focused on the film but the two end portions of the image formed on the film will be blurred so that the image on the film will appear somewhat as shown, in enlarged view, in Fig. 12. It is necessary, however, in order to produce a true, accurate sound record, that the slit image on the film should be an even, sharp, linear image.

This undesired image curvature, due to the curvature of field introduced by the lenses A, B and C, could be substantially eliminated by suitably correcting the lenses by means of different lens curvatures and dimensions as will be evident to those skilled in the art. Such corrections, however, would greatly restrict the effective working aperture of the lens system and consequently the amount of light, which reached the film F from the source L, would be greatly reduced. Since the light source L which is used in a sound recording apparatus is relatively weak in intensity, it is necessary that a maximum amount of light should reach the film in order to insure efficient operation. This requirement as to a large working aperture for the lens system therefore precludes the possibility of substantially eliminating the curvature of field by employing the usual methods of correcting the lens system.

Figure 2:
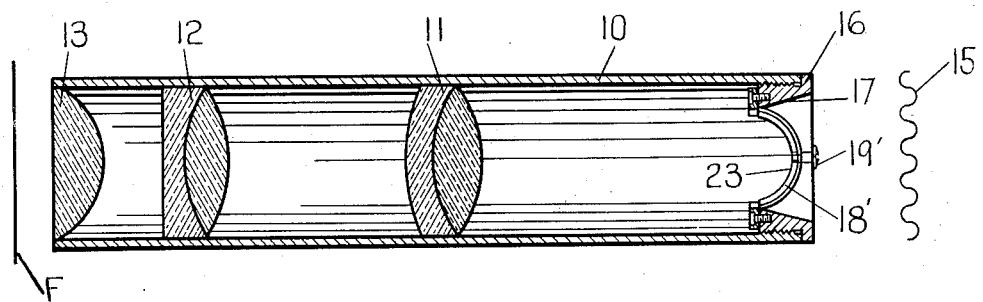
Fig. 2 shows a horizontal sectional view of the same.
Figure 3:
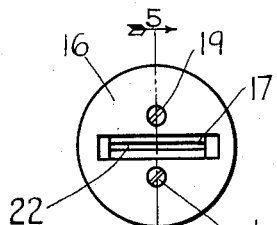
Fig. 3 shows an elevation view of my slit unit as seen looking in the direction of the arrow in Fig. 1.
Figure 4:
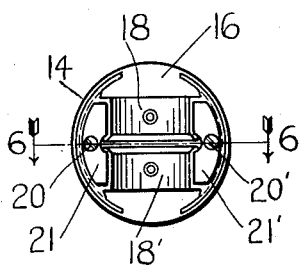
Fig. 4 shows in elevation a view of the opposite side of my slit unit.
Figures 5, 6:
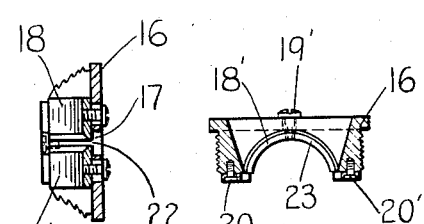
Fig. 5 shows a vertical sectional view taken on line 5—5.
Fig. 6 shows a horizontal section taken on line 6—6.
Figure 10:
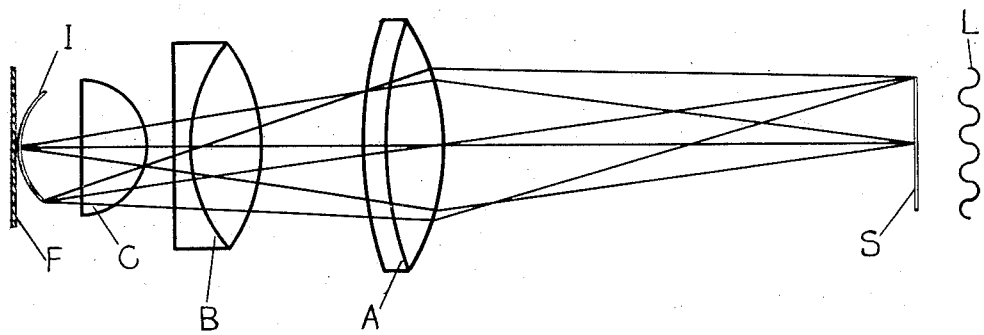
Fig. 10 is a diagrammatic view illustrating the performance of an optical system of the prior art.
Figure 11:
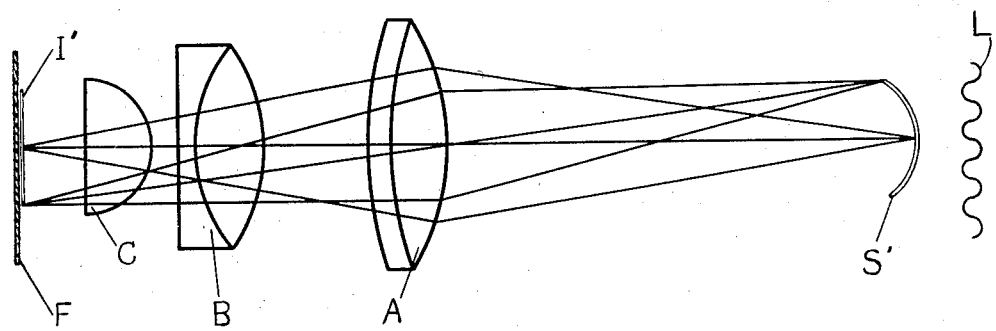
Fig. 11 is a diagrammatic view illustrating the performance of an optical system embodying my invention.
Figure 12:
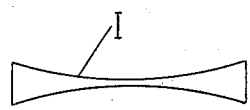
Fig. 12 shows an enlarged slit image as produced by the prior art system shown in Fig. 10.
Figure 13:
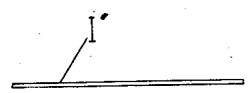
Fig. 13 shows an enlarged slit image as produced by the system embodying my invention as shown in Fig. 11.

By means of my improved slit, however, I am able to project onto the film a sharp, uniform slit image without reducing or restricting the effective working aperture of the lens system. The application of my invention to a sound recording apparatus is illustrated in Figs. 1 and 2 and the operation thereof is diagrammatically illustrated in Fig. 11. The elements shown in Fig. 10 are the same as those shown in Fig. 11 excepting the slit unit. In Fig. 11, S' indicates the curved illuminated slit which is imaged on the film F by the lenses A, B and C. The projected image, which is indicated at I', is a sharp, uniform, linear slit image such as shown in Fig. 13. Hence, by using a curved slit, a sharp, uniform image is projected onto the film and the lens system maintains the maximum effective aperture since it is unnecessary to correct the lenses for curvature of field.

Although in Figs. 10 and 11 the film F is shown as slightly spaced from the images I and I', respectively, it is understood that the images are projected onto the film. It is obvious that my invention may be practiced by using various other slit structures, such as the modification shown in Figs. 7 to 9, for example. Although I have shown my invention as applied to a sound recording apparatus, it is to be understood that my invention is equally well adapted for use with other devices wherein it is desired to form an image which is substantially free from curvature of field. Such modifications can obviously be made by one skilled in the art without departing from the spirit of my invention as pointed out in the appended claims.

I claim:

1. In a projection apparatus, the combination of a light source, a lens system and means defining a curved slit located between said source and system with the concave side of said slit facing said system, the axis of curvature of said slit being perpendicular to the axis of said lens system.

2. A projection system comprising a light source, lens means and a light-limiting device interposed between said source and lens means, said device comprising curved opaque means defining a curved slit with the concave side of said slit facing said lens means whereby the projected image of said slit is free from curvature of field.

3. In an apparatus of the character described, a light source, a lens system and means defining an arcuate slit positioned between said source and said lens system, the concave side of said slit facing said lens system.

4. An optical apparatus comprising a light source, a lens system, and means defining a curved slit interposed between said source and said lens system with the convex side of said slit remotely located from said system whereby a projected image of said slit which is formed by said system will be substantially free from curvature of field.

5. In apparatus for recording and reproducing sound records, the combination of a film, a light source, a lens system, and a device comprising a curved slit located between said source and system with the convex side of said slit remotely located from said system whereby an image of said slit will be projected onto said film substantially free from curvature of field.

6. In an apparatus of the character described, a light-limiting device comprising means defining a curved slit, means for illuminating said slit and lens means for forming an image of said slit, the concave side of said slit being adjacent to said lens means.

7. In an apparatus of the character described, the combination of a tube, lens means mounted in said tube, and a light-limiting device positioned in said tube, said device comprising curved opaque members spaced to provide a curved slit, the convex side of said slit being remotely positioned with respect to said lens means whereby the image of said slit which is formed by said lens means will be substantially free from curvature of field.

8. In an optical system, the combination of a lens system and a light-limiting device comprising spaced means defining a curved slit, the concave side of said slit facing said lens system, the optical axis of said lens system passing through said slit.

LEON V. FOSTER.